United States Patent [19]

Pelin

[11] Patent Number: 4,807,437
[45] Date of Patent: Feb. 28, 1989

[54] CLOSED SYSTEM, STANDPIPE OPERATED HYDROELECTRIC POWER PLANT

[76] Inventor: Charles Pelin, R.R. 1 - Box 1460, Eastsound, Wash. 98245

[21] Appl. No.: 168,641

[22] Filed: Mar. 15, 1988

[51] Int. Cl.⁴ .............................................. F16D 33/00
[52] U.S. Cl. ........................................ 60/325; 60/398; 290/1 R; 290/4 R
[58] Field of Search ................. 60/325, 327, 398, 495, 60/496; 290/1 R, 1 A, 4 R

[56] References Cited

U.S. PATENT DOCUMENTS 3,991,563 11/1976 Pelin ..................................... 60/325
4,075,838 2/1978 Pelin ..................................... 60/325

Primary Examiner—Edward K. Look

[57] ABSTRACT

The power plant employs fluid flow passages between the nipples and the pressure and tailwater collection chambers, which are restricted as to flow, and there are valve means in one passage employed to enable the nipples to discharge the tailwater to the pressure chamber, and then restabilize at the pressure of the same, when the offset vessels are extended and retracted with respect to the nipples.

13 Claims, 4 Drawing Sheets

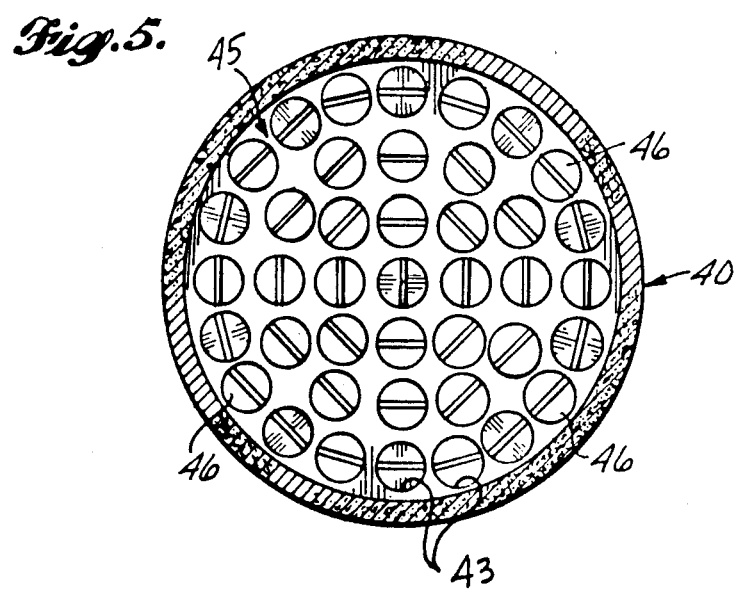
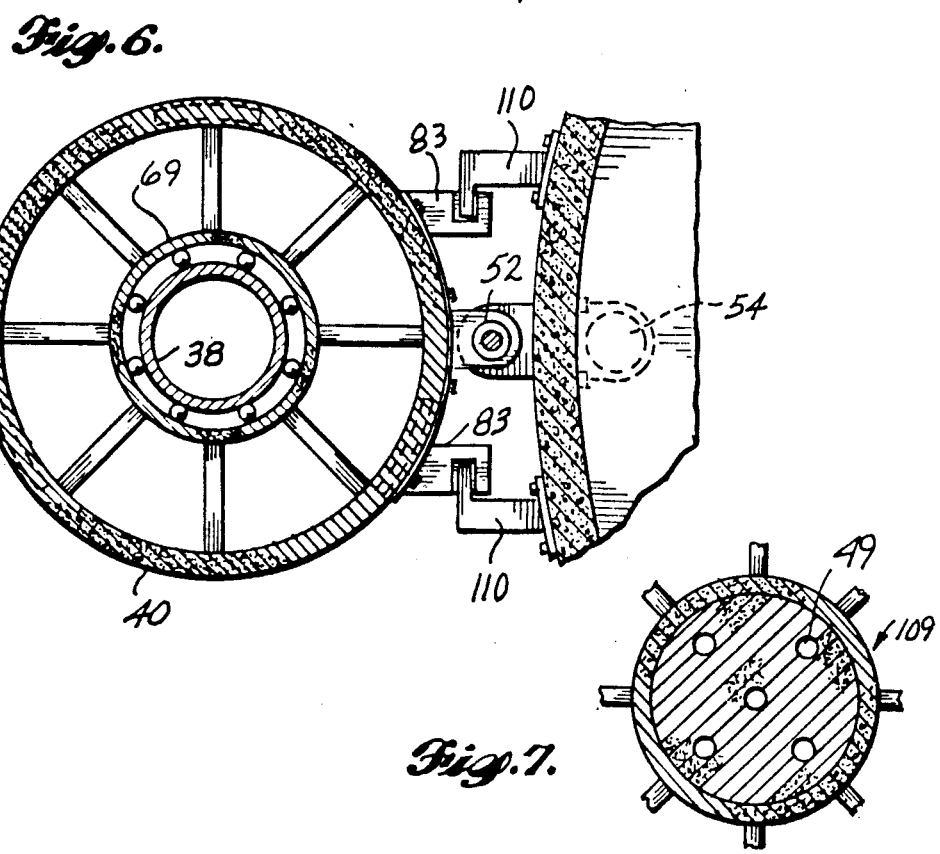

CLOSED SYSTEM, STANDPIPE OPERATED HYDROELECTRIC POWER PLANT

This application is a continuation of my copending Application of the same title, filed May 2, 1986 and having Ser. No. 865,675. The earlier application is now abandoned.

TECHNICAL FIELD

This invention relates to a hydroelectric power plant, and in particular, a closed system, standpipe operated power plant of the type disclosed in my U.S. Pat. No. 4,075,838.

BACKGROUND ART

The hydroelectric power plant of the present invention employs a generating system similar to that employed in my U.S. Pat. No. 4,075,838. As in the patent, there are casing means defining a first chamber filled with a first column of water and a standpipe relatively inclined to the horizontal thereabove to pressurize the first column of water. There is also a housing enclosed in the first chamber which defines a second chamber therein for containing water in a second column horizontally offset from the first column of water. The housing has a series of penstocks about the perimeter thereof which open into the first column of water at a first level above the second chamber, and discharge into the second chamber at a second level below the first level. In addition, there are hydroelectric power generation means including turbines in the penstocks and means for discharging the tailwater from the respective turbines. The tailwater discharge means include elongated hollow-bore, open ended nipples extending into the first chamber from the housing at a third level below the first and second levels and having open ended thimble-like vessels telescopically engaged on the end portions thereof which are relatively remote from the housing, to be extended and retracted in relation to the respective nipples, axially thereof. There are also drive means operable to extend and retract the respective vessels, and float operated check valves in the vessels adjacent the end openings of the vessels relatively remote from the housing, each of which is adapted to permit flow through the bore of the respective nipple in the direction relatively away from the housing toward the first column of water in the first chamber when open, and prevent flow in the opposite direction when closed. As in the patent, control means are connected to the drive means to extend and retract the respective vessels in staggered sequence to one another about the circumference of the housing, with each vessel undergoing an at rest period between the respective retraction and extension stages thereof, when the vessel is fully retracted.

DISCLOSURE OF THE INVENTION

According to the present invention, however, the housing is surrounded by a moat-like recess and has an overhang thereover, and the nipples are secured to the periphery of the housing and depend into the recess below the overhang so that the vessels are telescopically engaged thereon in the recess, offset from the housing. The second chamber extends above the overhang and has discharge openings in the same adjacent the respective nipples. There are means below the overhang defining passages inter-connecting the nipples relatively adjacent the housing. There are also movable closure means for opening and closing the respective passages to the second chamber through the discharge openings, when the respective vessels are disposed in the at-rest condition thereof. And in addition, there are means defining stabilization openings through which the passages communicate with the first column of water to provide a constant state of equilibrium between the pressures of the first and second columns of water when the vessels are in the extended, retracted, and at-rest conditions thereof. Meanwhile, the aforementioned control means for the vessels are operable through movement of the respective closure means, to control the rate of extension and retraction of the respective vessels and the length of their respective rest periods, as a function of the water level in the second chamber; and the height of the first column of water in the standpipe is adapted to drive the turbines, the vessels are each adapted in buoyancy to hover in equilibrium in the first column of water when at rest, and the number of nipples and vessels is adapted in relation to the number of penstocks and turbines so that the vessels collectively discharge the tailwater from the turbines at a rate adapted to maintain the water level in the second chamber between predetermined limits.

The present arrangement is a far simpler one than that in the patent and greatly reduces the load on the drive means for the vessels so that the drive means can operate at maximum efficiency. The new arrangement also provides more freedom to elongate the nipples so that the vessels can travel over a longer stroke. Moreover, the vessels no longer need to be sectionalized telescopically, and by offsetting the nipples and vessels into the first chamber from the housing, the nipples and vessels can be given a larger diameter and thus a greater capacity for storing water. The greater stroke and capacity allow the tailwater discharge means to operate in turn with fewer nipples and vessels; and the offset, unsectionalized nature of the vessels permits the vessels to be telescopically engaged on the nipples by means of certain additional features of the invention, as shall be explained.

In the presently preferred embodiments of the invention, the respective discharge and stabilization openings have means therein for throttling flow through the same, and there are valve means associated with the discharge openings which are shiftable by the control means to vary the throttling effect in the discharge openings, and thus the pressure differential between corresponding pairs of discharge and stabilization openings. For example, in certain of the presently preferred embodiments of the invention, the respective discharge openings have pairs of valve members thereacross which have mutually opposing apertures therein and are shiftable in relation to one another so as to move the apertures in and out of registry with one another axially of the respective discharge openings. In some embodiments, the valve members take the form of pairs of plates which are relatively slidably engaged with one another crosswise of the respective discharge openings, and have mutually opposing openings therein that move in and out of registry with one another when the plates are slidably adjusted in relation to one another. In many embodiments, moreover, the valve means are shiftable by the control means to fully close the respective discharge openings to flow therethrough when the vessels on the corresponding nipples are disposed in the at-rest condition thereof.

The control means are often interconnected with the valve means by servocontrol means, such as hydraulic cylinders, which operate, for example, to slidably adjust the throttling effect of the plates in the latter mentioned embodiments, including an adjustment wherein the openings of the plates are fully out of registry with one another to close the respective discharge openings to flow therethrough when the vessels on the corresponding nipples are disposed in the at-rest condition thereof.

The throttling means in the respective stabilization openings often include venturi-type throttling means which are adapted to effect a pressure differential between the respective pairs of discharge and stabilization openings at which (1) the water in the second chamber tends to discharge to the bores of the respective nipples when the corresponding vessels are in the at-rest condition thereof and the valve means are shifted to open the corresponding passages to the second chamber, and (2) the valve means can be shifted to control the flow of water from the second chamber to the bore of each nipple when the corresponding vessel is extended from the at-rest condition thereof. In one group of presently preferred embodiments of the invention, the stabilization openings have plug-like inserts therein which in turn have spaced, parallel elongated venturi tubes therein and are disposed in the respective stabilization openings to intercept flow therethrough axially of the nipples. In many embodiments, the inserts are disposed in the relatively adjacent end portions of the nipples and the tubes open into the first column of water in the first chamber at substantially the same level as the respective discharge openings open into the second column of water in the second chamber.

In addition to the valve-adjusted throttling means in the discharge openings, the latter openings may also have baffle-type throttling means therein which are disposed between the valve means and the relatively adjacent end portions of the nipples, to effect a non-laminar or turbulent flow condition in the respective discharge openings at which the valve means can more closely control the pressure differential between the respective discharge and stabilization openings when the vessels are retracted and extended to and from the at-rest condition thereof.

The vessels commonly take the form of open ended tubes which are telescopically engaged on expansion rings of solid lubricant material flanged about the nipples corresponding thereto. In most presently preferred embodiments of the invention, moreover, the expansion rings are flanged about the relatively remote end portions of the nipples and the vessels have ball bearing expansion rings spider mounted in the relatively adjacent end portions thereof to movably support them on the bodies of the nipples as the vessels telescope back and forth on the respective expansion rings.

In certain presently preferred embodiments of the invention, the respective passages are formed in corbel-like subchambers below the overhang, and the discharge openings are formed by vertical chutes depending within the subchambers from the bottom of the overhang. The movable closure means are formed at the tops of the chutes adjacent the bottom of the second chamber.

BRIEF DESCRIPTION OF THE DRAWINGS

These features will be better understood by reference to the accompanying drawings which illustrate one of the presently preferred embodiments of the invention wherein the first chamber of the power plant is formed or erected below ground and the standpipe is relatively upstanding from the roof of the same.

In the drawings:

FIG. 5 is a cross-sectional view along the line 5—5 of FIG. 2;

FIG. 6 is a similar view along the line 6—6 of FIG. 2; and

FIG. 7 is another such view along the line 7—7 of FIG. 2,

BEST MODE FOR CARRYING OUT THE INVENTION

Figure 1:
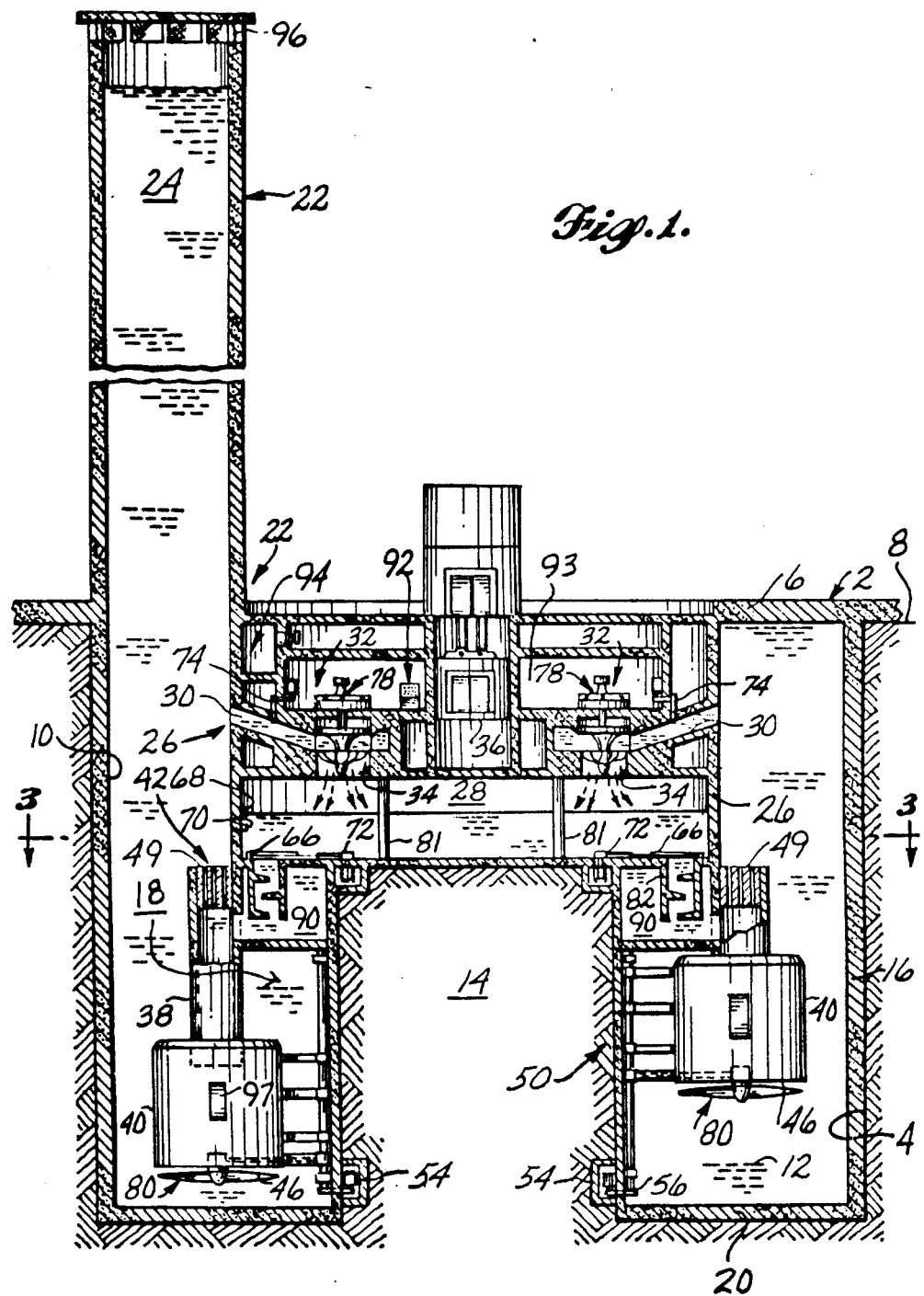
FIG. 1 is a vertical cross-sectional view of the power plant.

Referring to the drawings, it will be seen that the power plant once again comprises a vault-like cylindrical casing 2 which is formed in an excavation 4 in the ground so that the lid or roof 6 thereof is flush with the surface 8 of the ground. The casing 2 defines a pressure chamber 10 which is filled with a body of water 12 and has a pier 14 upstanding centrally thereof so that the pier is spaced apart from the side walls 16 of the chamber by an annular moat-like recess 18 therearound. The walls 16, roof 6, bottom 20 and pier 14 of the casing are all formed from reinforced concrete and have thick cross-sections adapted to withstand considerable pressure in the body of water. The pressure is generated by a cylindrical standpipe 22 which is relatively upstanding from the roof 6 of the casing above the chamber 10 and has a column of water 24 therein communicating with the body of water 12 in the chamber 10. The standpipe 22 has a thick concrete cross-section integral with that of the roof 6, and is disposed adjacent the perimeter of the casing 2 so that the outside radius of the standpipe coincides with that of the recess 18, as seen in FIG. 1.

The power plant also comprises a cylindrical housing 26 which is supported on the pier 14 between the pier and the roof 6 of the casing so as to be enclosed in the pressure the roof so as to support it on the pier, and extends radially outwardly from the pier so as to overhang the recess 18. The housing defines a tailwater collection chamber 28 and a series of penstocks 30 which open into the body of water 12 in the pressure chamber 10 at points spaced about the perimeter of the housing below the column of water 24 in the standpipe, and discharge into the collection chamber 28 at a level therebelow. The penstocks 30 are accompanied by hydroelectric power generating means 32 that include turbines 34 which are disposed in the respective penstocks 30 and discharge their tailwater into the collection chamber 28 through draft tubes therebetween. The tailwater is discharged from the collection chamber 28 in turn by a pair of open ended, hollow-bore nipples 38 which depend from the housing in the recess 18 on vertical axes abreast of the pier 14. The nipples 38 open into the recess at levels below that of the collection chamber and have open ended thimble-like vessels 40 telescopically engaged thereon, which are adapted to be extended and retracted in relation the tailwater as it accumulates in the collection chamber. The vessels 40 are extended and retracted by a corresponding number of drive means 50 housed between the vessels and the pier. The drive means 50 have associated control means 92 including a pair of water level sensors 68 and 70 in the collection chamber 28. The control means 92 are connected to the respective drive means so as to extend and retract the vessels in staggered sequence to one another about the circumference of the housing, with each vessel undergoing an at-rest period between the respective retraction and extension stages thereof when the vessel is fully retracted. The control means 92 also control the rate of extension and retraction of the vessels: and the length of their respective rest periods, as a function of the water level in the collection chamber. In addition, each penstock has a throttle valve 74 therein to control the rate of flow therethrough, and the number of nipples and vessels is adapted in relation to the number of penstocks and turbines so that the vessels collectively discharge the tailwater from the turbines at a rate adapted to maintain the water level in the collection chamber between limits corresponding to the levels of the sensors 68 and 70.

Figure 2:
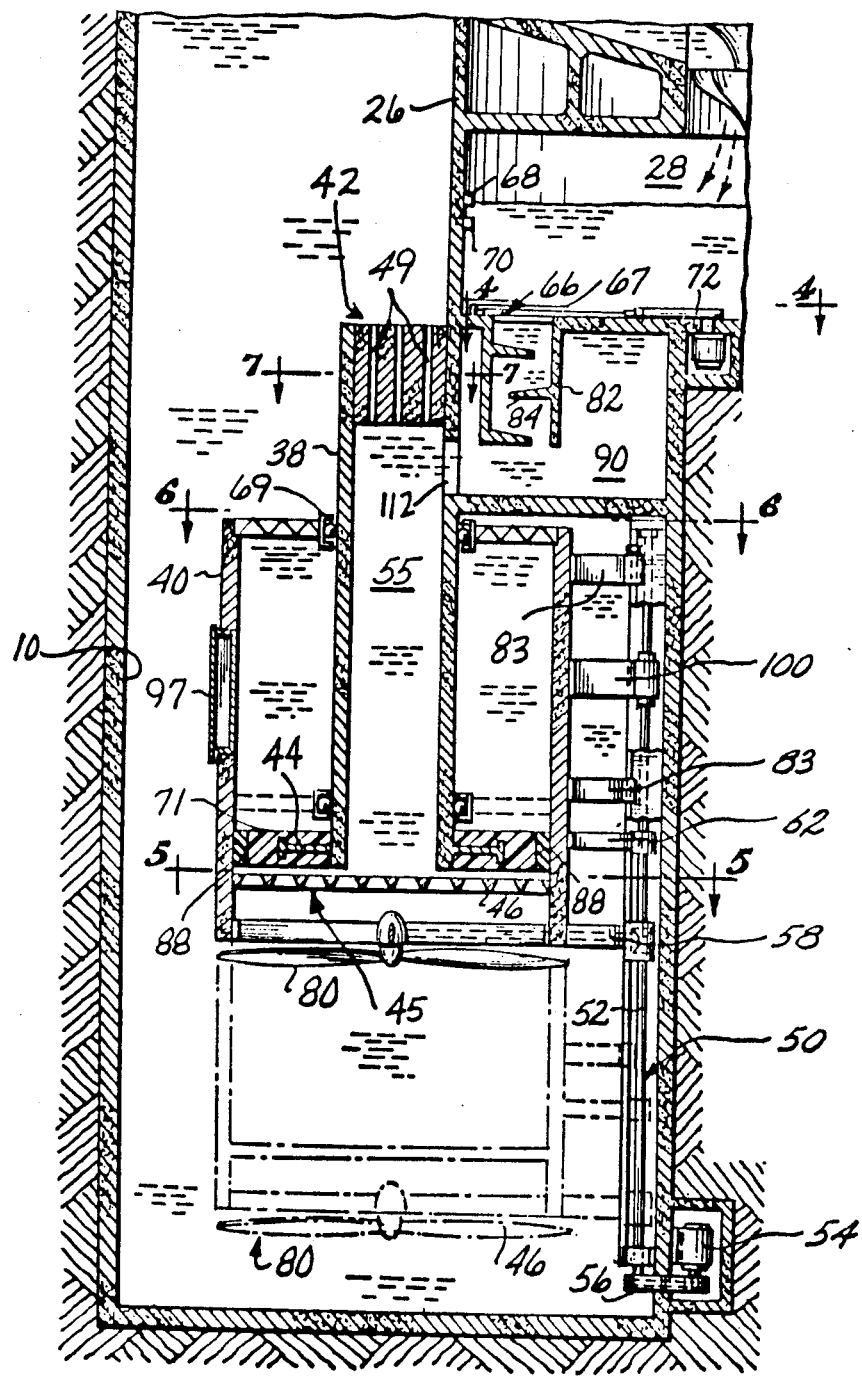
FIG. 2 is a greatly enlarged vertical cross-sectional view of a portion of the tailwater discharge means employed in the plant.
Figure 3:
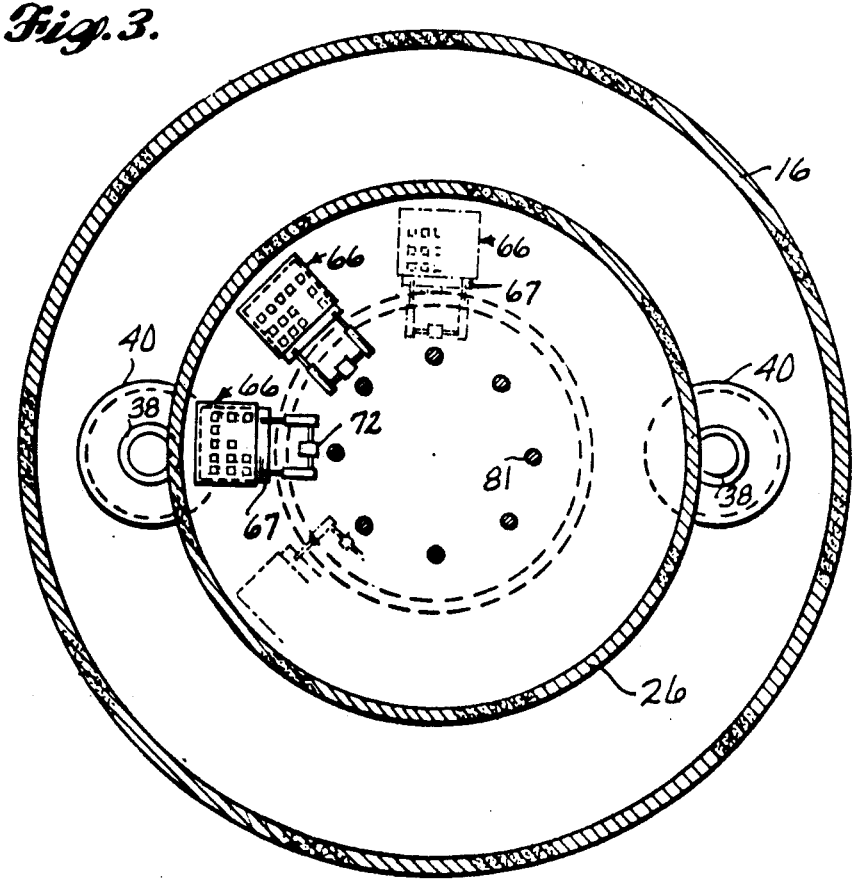
FIG. 3 is a cross-sectional view along the line 3—3 of FIG. 1.

More specifically, the housing has a pair of corbel-like subchambers 90 at diametrically opposing sides thereof which depend from the overhang of the housing in the recess 18 of the pressure chamber 10. The nipples 38 are elongated tubular members which are arranged on vertical axes and secured at their upper ends to the outer peripheries of the subchambers 90. The upper end portions of the nipples have plug-like inserts 42 therein which in turn have a small number of spaced parallel venturi tubes 49 extending vertically between the chamber 10 and the bores 55 of the nipples. The lower end portions of the nipples have wide diameter expansion flanges 71 thereon (FIG. 2) which are made of a rigid non-corrosive polymeric material. The flanges 71 have an edge-flanged disc 44 of metal reinforcing material therein, and an outer ring 88 of solid lubricating material about the outer peripheries thereof.

The vessels 40 are also tubular and are adapted to telescopically engage about the lubricating rings 88 of the flanges 71. In addition, the upper end portions of the vessels have spider mounted ball bearing expansion rings 69 therein which are movably supported on the bodies of the nipples 38 to ride on the outer peripheries thereof as the vessels telescope up and down on the rings 88 of the flanges. Below the flanges 71, the vessels 40 have disc-like closure plates 45 therein which are apertured with a multiplicity of openings 43 that are controlled by a corresponding number of float operated check valves 46. The valves 46 are mounted in the openings 43 to open when the vessels are retracted, that is, raised on the corresponding nipples, and to float closed when the vessels are at rest at the top of their stroke, and to remain closed as the vessels are extended, that is, lowered on the corresponding nipples.

The vessels 40 are adapted in buoyancy to hover in equilibrium in the body of water 12 when in the at-rest condition thereof, that is, at the top of their stroke. See my U.S. Pat. No. 3,991,563 in this connection. The vessels are equipped, moreover, with trim tanks 97 having inlets and outlets (not shown) by which the weight of the vessels can be adjusted from time to time as required. Electrical circuitry (not shown) is built into the walls of the vessels and is closed when the vessels are retracted and at-rest, so that the trim tank adjustment can be accomplished from a central control room 93.

The vessels are also equipped with propellor means 80 for increasing the forward thrust of the same in the direction of their extension. Again, see my U.S. Pat. No. 3,991,563.

As indicated, the vessels are extended and retracted by the drive means 50 housed between the vessels and the pier. Each drive means 50 includes a drive screw 52 mounted on a parallel to the axis of the corresponding nipple. The screw 52 is driven by a motor 54 in the pier through a variable gear box 56, and is interconnected with the vessel through a pair of arms 62 and 100 on the periphery of the vessel. The screw is engaged in a bushing (not shown) on each arm, and the bushing is threaded to convert part of the vessel. The motion is guided by a pair of interdigitating rails 83 and arms 110 on the vessels and the pier 14. Stops (not shown) limit the motion of the vessel.

The propeller means 80 are also driven off of the screw 52, again by an arm 58 having a bushing (not shown) threadedly engaged on the screw.

The subchambers 90 serve to interconnect the tailwater collection chamber 28 with the bores 55 of the nipples. The chamber 28 opens into each subchamber through a vertical chute 82 depending within the sump of the subchamber adjacent the outer periphery thereof. The chute 82 is rectangular in cross-section and has a similarly shaped throttle valve 66 controlling the upper opening thereof at the bottom of the chamber 28. The chute also has a set of baffles 84 therein which are alternately oppositely cantilevered from the radially opposing walls of the chute. The flow through the chute discharges into the bottom of the subchamber, and the subchamber discharges in turn into the bore 55 of the adjoining nipple through a port 112 in the adjacent side thereof below the insert 42. The flow thus enters the bore of the nipple at the same level as that through the insert, but without experiencing the sharp pressure drop occurring in the venturi tubes 49.

Figure 4:
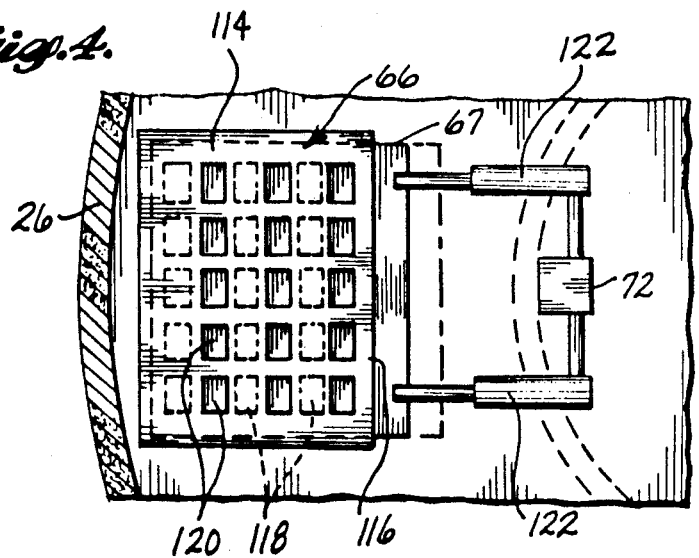
FIG. 4 is a cross-sectional view along the line 4—4 of FIG. 2.

The throttle valves 66 (FIG. 4) for the chutes 82 take the form of pairs of relatively slidably engaged plates 67 and 114, one of which, 114, is raised on a parapet at the bottom of the chamber, and the other of which, 67, is slidably inserted in the parapet through a slot 116 in one side thereof. The pairs of plates 67 and 114 have patterns of rectangularly shaped openings 118 and 120 therein, and the openings are adapted to register with one another in one position of the slidable plate 67. Pairs of hydraulic cylinders 122 are employed to drive the slidable plates 67 under the control of hydraulic motors 72 installed in the pier. The motors 72 are operated in turn by the control means 92 which coordinate the opening and closing of the valves 66, and the adjustment of the same, to correspond to the position and speed of the vessels.

Initially, when the power plant is put into operation, all of the vessels 40 are fully retracted over the nipples, and the nipples 38 and subchambers 90 are filled with water. The check valves 46 on the vessels are closed, and the throttle valves 66 at the top of the chutes 82 are also closed. The water in the nipples and the subchambers is stabilized at the pressure of the chamber 10, and until the throttle valves 74 in the penstocks are opened, the tailwater collection chamber 28 will remain empty. When the latter throttle valves are opened, however, and water is released into the penstocks 30, the tailwater from the turbines discharges into the chamber 28 and accumulates to the high level control sensor 68. At this point, the control means 92 activate the drive means 50 for the vessels, which in turn drive the vessels in staggered sequence to one another as mentioned. When each vessel undergoes extension, the check valves 46 in the same remain closed, while the control means open the throttle valve 66 of the same and allow the water in the chamber 28 to discharge into the subchamber 90 through the chute 82. Ultimately, when the vessel is fully extended, the control means 92 reverse the direction of the vessel and retract it over the nipple, while the check valves 46 in the same open to convert the vessel into a bottomless tube. The control means also reclose the throttle valve 66 in the chute, so as to isolate the chute from the chamber 28 while the remaining vessel or vessels operate to discharge the water in the same to the pressure chamber. When the vessel resumes its at-rest condition, the check valves float closed once again, and the water in the nipple and the subchamber stabilizes at the pressure of the pressure chamber.

Throughout, the venturi tubes 49 in the inserts 42 transmit the external water pressure, without loss, to the bores 55 of the nipples 38, and to the telescopic drain vessels 40, so that the internal pressure against the prow of each vessel is always in equilibrium with the external pressure against the prow, regardless of whether the vessel is extending, retracting, or at rest. Furthermore, the variable pitch propeller means 80 cause a flow of water across the prow of each vessel and lessen the external pressure against it, to further increase the efficiency of the extending movement. The trim tanks 97 are controlled, meanwhile, to maintain neutral buoyancy in the vessels due to change in water temperature or some other fluctuation.

The turbines 34 commonly drive generators 78 in a room thereabove.

A decompression chamber 94 provides access to and from the pressure chamber 10.

The insert-filled upper end portions 109 (FIG. 7) of the nipples may be monolithic.

The housing may be equipped with an elevator 36.

I claim:

1. In a hydro-electric power plant comprising:

casing means defining a first chamber filled with a first column of water and a standpipe relatively inclined to the horizontal thereabove to pressurize the first column of water, a housing enclosed in the first chamber and defining a second chamber therein for containing water first column of water, housing having a series of penstocks about the perimeter thereof which open into the first column of water at a first level above the second chamber and discharge at a second level below the first level, hydroelectric power generation means including turbines in the penstocks and means for discharging the tailwater from the respective turbines, the tailwater discharge means including elongated hollow bore, open ended nipples extending into the first chamber from the housing at a third level below the first and second levels and having open ended, thimble-like vessels telescopically engaged on the end portions thereof which are relatively remote from the housing, to be extended and retracted in relation to the respective nipples, axially thereof, drive means operable to extend and retract the respective vessels, float operated check valves in the vessels adjacent the end openings of the vessels relatively remote from the housing, each of which is adapted to permit flow through the bore of the respective nipple in the direction relatively away from the housing toward the first column of water in the first chamber when open, and to prevent flow in the opposite direction when closed, and control means connected to the drive means to extend and retract the respective vessels in staggered sequence to one another about the circumference of the housing, with each vessel undergoing an at rest period between the respective retraction and extension stages thereof, when the vessel is fully retracted, the improvement wherein:

the housing is surrounded by a moat-like recess and has an overhang thereover, the nipples are secured to the periphery of the housing and depend into the recess below the overhang so that the vessels are telescopically engaged thereon in the recess, offset from the housing, the second chamber extends above the overhang and has discharge openings in the same adjacent the respective nipples, and there are means below the overhang defining passages interconnecting the discharge openings with the end portions of the nipples relatively adjacent to the housing, movable closure means for opening and closing the respective passages to the second chamber through the discharge openings, when the respective vessels are disposed in the at-rest condition thereof, and means defining stabilization openings through which the passages communicate with the first column of water to provide a constant state of equilibrium between the pressures of the first and second columns of water when the vessels are in the extended, retracted, and at-rest conditions thereof, the control means for the vessels being operable through movement of the respective closure means, to control the rate of extension and retraction of the respective vessels and the length of the their respective rest periods, as a function of the water level in the second chamber, and the height of the first column of water in the standpipe being adapted to drive the turbines, the vessels being each adapted in buoyancy to hover in equilibrium in the first column of water when at rest, and the number of nipples and vessels being adapted in relation to the number of penstocks and turbines so that the vessels collectively discharge the tailwater from the turbines at a rate adapted to maintain the water level in the second chamber between the predetermined limits.

2. The hydroelectric power plant according to claim 1 wherein the respective discharge and stabilization openings have means therein for throttling flow through the same, and there are valve means associated with the discharge openings which are shiftable by the control means to vary the throttling effect in the discharge openings, and thus the pressure differential between the corresponding pairs of discharge and stabilization openings.

3. The hydroelectric power plant according to claim 2 wherein the respective discharge openings have pairs of valve members thereacross which have mutually opposing apertures therein and are shiftable in relation to one another so as to move the apertures in and out of registry with one another axially of the respective discharge openings.

4. The hydroelectric power plant according to claim 3 wherein the valve members take the form of pairs of plates which are relatively slidably engaged with one another crosswise of the respective discharge openings and have mutually opposing openings therein that move in and out of registry with one another when the plates are slidably adjusted in relation to one another.

5. The hydroelectric power plant according to claim 2 wherein the valve means are shiftable by the control means to fully close the respective discharge openings to flow therethrough when the vessels on the corresponding nipples are disposed in the at-rest condition thereof.

6. The hydroelectric power plant according to claim 2 wherein the control means are interconnected with the valve means by servocontrol means which operate to adjust the throttling effect in the respective discharge openings, including an adjustment wherein the respective discharge openings are closed to flow therethrough when the vessels on the corresponding nipples are disposed in the at-rest condition thereof.

7. The hydroelectric power plant according to claim 4 wherein the control means are interconnected with the valve plates by hydraulic cylinders which operate to slidably adjust the throttling effect of the plates, including an adjustment wherein the openings of the plates are fully out of registry with one another to close the respective discharge openings to flow therethrough when the vessels on the corresponding nipples are disposed in the at-rest condition thereof.

8. The hydroelectric power plant according to claim 2 wherein the stabilization openings have plug-like inserts therein which in turn have spaced, parallel, elongated venturi tubes therein and are disposed in the respective stabilization openings to intercept flow therethrough axially of the nipples.

9. The hydroelectric power plant according to claim 8 wherein the inserts are disposed in the relatively adjacent end portions of the nipples and the tubes open into the first column of water in the first chamber at substantially the same level as the respective discharge openings open into the second column of water in the second chamber.

10. The hydroelectric power plant according to claim 2 wherein the respective discharge openings also have baffle-type throttling means therein which are disposed between the valve means and the relatively adjacent end portions of the nipples, to effect a non-laminar flow condition in the respective discharge openings at which the valve means can more closely control the pressure differential between the respective discharge and stabilization openings when the vessels are retracted and extended to and from the at-rest condition thereof.

11. The hydroelectric power plant according to claim 1 wherein the vessels take the form of open ended tubes which are telescopically engaged on expansion rings of solid lubricant material flanged about the nipples corresponding thereto.

12. The hydroelectric power plant according to claim 11 wherein the expansion rings are flanged about the relatively remote end portions of the nipples and the vessels have ball bearing expansion rings spider mounted in the relatively adjacent end portions thereof to movably support them on the bodies of the nipples as the vessels telescope back and forth on the respective expansion rings.

13. The hydroelectric power plant according to claim 1 wherein the respective passages are formed in corbel-like subchambers below the overhang, the discharge openings are formed by vertical chutes depending within the subchambers from the bottom of the overhang, and the movable closure means are formed at the tops of the chutes adjacent the bottom of the second chamber.

* * * * *